UNITED STATES PATENT OFFICE.

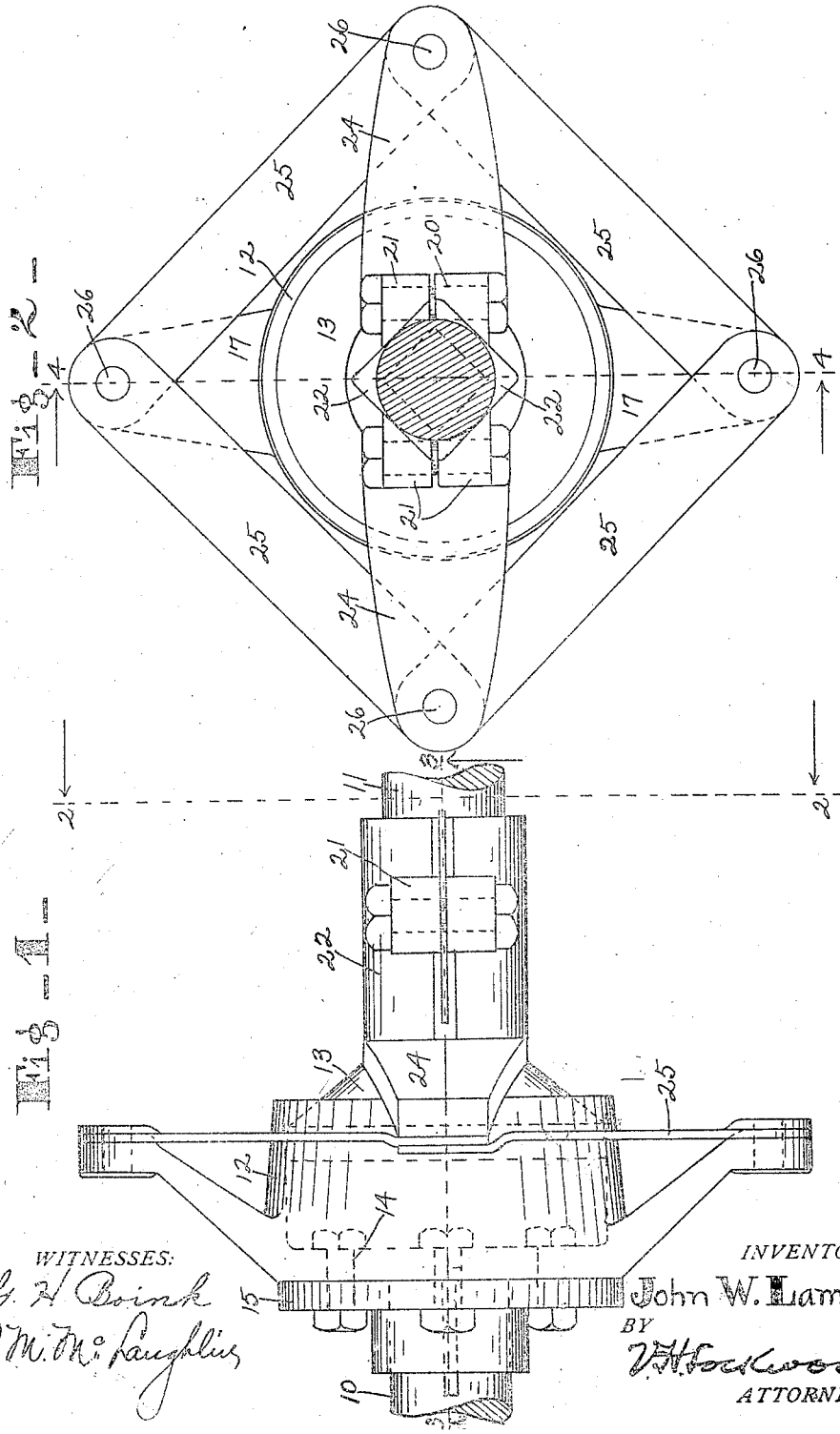

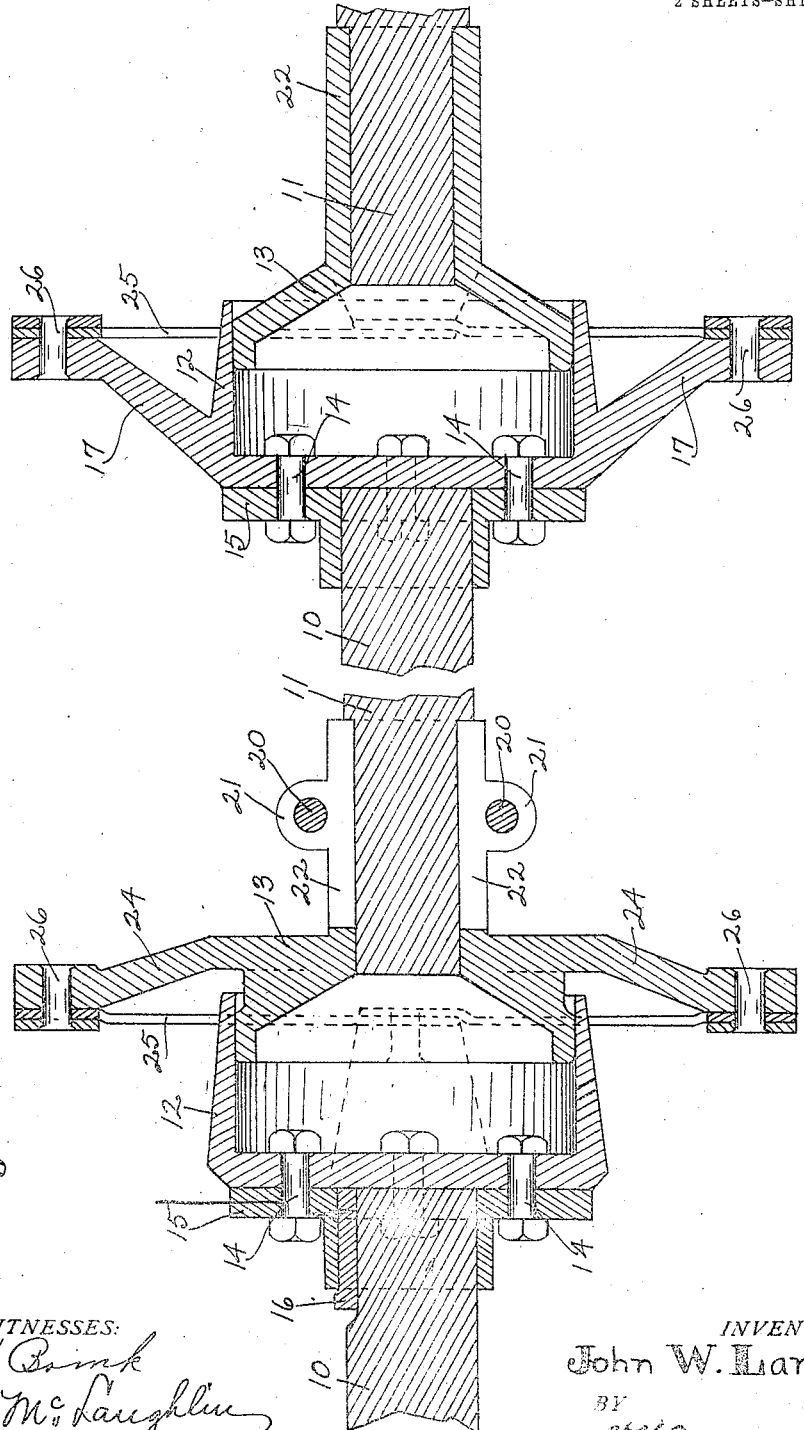

JOHN W. LAMBERT, OF ANDERSON, INDIANA, ASSIGNOR TO THE BUCKEYE MANUFACTURING COMPANY, OF ANDERSON, INDIANA, A CORPORATION OF INDIANA.

POWER-TRANSMISSION MECHANISM 1,025,875.    Specification of Letters Patent.    Patented May 7, 1912.

Application filed May 26, 1910. Serial No. 563,563.

*To all whom it may concern:*

Be it known that I, JOHN W. LAMBERT, of Anderson, county of Madison, and State of Indiana, have invented a certain new and useful Power-Transmission Mechanism; and I do hereby declare that the following is a full, clear, and exact description thereof, reference being had to the accompanying drawings.

The object of this invention is to provide an improved power transmission mechanism adapted particularly for friction driven automobiles, but may be used in connection with any other mechanism where either the driving or driven member of the mechanism must be capable of some longitudinal movement.

The nature of the invention will be understood from the accompanying drawings and the following description and claim.

In the drawings Figure 1 is a plan view of said mechanism, the driving and driven shafts being partially broken away. Fig. 2 is an elevation of the coupling from the line 2—2 of Fig. 1, the driven shaft being in section on said line. Fig. 3 is a horizontal longitudinal central section on the line 3—3 of Fig. 1. Fig. 4 is a vertical longitudinal central section on the line 4—4 of Fig. 2 and showing the changed position of the driven member.

There is shown herein a driving shaft 10 and a driven shaft 11 with a driving member 12 secured to the driving shaft and a driven member 13 secured to the driven shaft. While shafts are shown, said driving and driven members 12 and 13 may be secured to any other driving or driven means; for instance, the driving member 12 can be secured to the fly wheel directly instead of to the engine shaft 10, and also, the driving and driven members 12 and 13 can be interchanged, the member 13 being secured to the driving shaft 10 or other driving means, and the driving member 12 being secured to the driven shaft 11, for this invention relates only to the form and relative arrangement of the members 12 and 13, regardless of what they may be secured to.

The coupling member 12 is an open-ended cylinder of even internal bore and secured by the bolts 14 to the ring 15 secured on the driving shaft 10 by a key 16. From said cylinder 12 a pair of oppositely extending substantially radial arms 17 extend, as shown in Figs. 1 and 4. They extend at an inclination so that their outer ends are in a plane nearer the open end of the cylinder than the closed end thereof.

The member 13 is clamped on the end of the driven shaft 11 by bolts 20 through ears 21 on a split sleeve 22. Said member 13 has a cylindrical portion which fits snugly in the cylindrical portion of the member 12 so as to be longitudinally slidable therein, and one serves to guide the other in the longitudinal movement of either. Said member 13 has a pair of oppositely extending arms 24 corresponding with the arms 17 on the other member 12.

In assembling the two members, the two sets of arms are placed ninety degrees apart, as shown in Figs. 1 and 2, and their ends are connected to flat spring plates or strips 25 by rivets 26, or the like. The spring strips 25 yield in a direction longitudinally of the shafts but in no other direction, and, therefore, they permit longitudinal movement of either member or flexible movement of the coupling.

In friction driven automobiles it is desired that the driven shafts be longitudinally movable by the pedal mechanism of the machine so as to move the friction disks into and out of engagement with each other and also to control the frictional engagement of the disks when in operation, for when climbing a hill or doing heavy work, the frictional engagement must be greater than is necessary at other times. Since this strain is considerable and the torsional strain is great in large automobiles, the construction of the coupling herein shown becomes very important as the members effectually guide each other and hold each other in place, in addition to the guidance and holding arising from the arms 17 and 24 and spring plates or strips 25.

I claim as my invention:

Power transmission mechanism including two coupling members arranged coaxially with reference to each other, one member having a longitudinally-extending cylindrical bearing portion with arms extending outwardly therefrom and the other member having a longitudinally-extending cylindrical bearing portion snugly fitting and slidable in the cylindrical portion of the first member and also having arms extending outwardly therefrom, and flat spring metal strips connecting the ends of said arms successively, substantially as set forth.

In witness whereof, I have hereunto affixed my signature in the presence of the witnesses herein named.

JOHN W. LAMBERT.

Witnesses:
 GLEN A. DAVIS,
 K. MERZ SHOEMAKER.